United States Patent [19]

Barlotta et al.

[11] Patent Number: 4,932,152
[45] Date of Patent: Jun. 12, 1990

[54] FISHING ROD HOLDER

[76] Inventors: Joseph Barlotta, 87 Snyder Ave., Sayreville, N.J. 08872; Robert W. Jorgensen, 216 Wilson Ave., Port Monmouth, N.J. 07758; Donald E. McCormick, 68 Middlehill Rd., Colonia, N.J. 07067

[21] Appl. No.: 406,258

[22] Filed: Sep. 12, 1989

[51] Int. Cl.⁵ .............................................. A01R 97/10
[52] U.S. Cl. ..................................... 43/21.2; 248/515; 248/519
[58] Field of Search ................... 43/17, 21.2; 248/515, 248/514, 519, 520

[56] References Cited

U.S. PATENT DOCUMENTS 2,540,584  2/1951  Jaycox ................................. 248/515
4,645,167  2/1987  Hardwick ........................... 248/520
4,827,654  5/1989  Roberts ............................... 43/21.2

Primary Examiner—M. Jordan
Attorney, Agent, or Firm—Salvatore C. Mitri

[57] ABSTRACT

There is disclosed a fishing rod holder the primary members of which can be rotated through circular planes that are perpendicular to each other enabling the fishing rod holder to accommodate any variety of fishing circumstances.

5 Claims, 3 Drawing Sheets

FISHING ROD HOLDER

BACKGROUND OF THE INVENTION

1. Field of the Invention

The present invention relates to a fishing rod holder capable of being rotatably adjusted to accommodate a multitude of fishing circumstances such as placement on a boat, sea or water conditions, and the like. More particularly, the fishing rod holder of the invention can be mounted on any flat surface such as a gunwale or bulkhead and, since it is comprised of rotatably adjustable members, it can be positioned in any desired position holding a fishing rod unattended until a fish strikes.

2. Description of Relevant Art

Fishing from a boat, whether lake fishing, bay fishing or deep sea fishing, usually requires that the fisherman hold the fishing rod in his hands for prolonged periods of time. In order to ease the fisherman's chore, several devices have been developed to contain a fishing rod and free the fisherman from holding the fishing rod until a fish strikes. For example, adjustable fishing rod holders are disclosed in U.S. Pat. Nos. 3,182,937; 3,519,190; and 3,783,547. An adjustable fishing rod holder having a fish strike alarm means is disclosed in U.S. Pat. No. 4,807,384. And, an adjustable fishing rod holder capable of supporting more than one fishing rod is disclosed in U.S. Pat. No. 4,793,086.

The fishing rod holders disclosed in the above-identified patents are not readily capable of being mounted on both a horizontal surface such as the gunwale of a boat and a vertical surface such as the bulkhead of a boat. Furthermore, such fishing rod holders are adjustable through only one plane or direction.

SUMMARY OF THE INVENTION

The present invention provides a fishing rod holder that is versatile in that it can be mounted to either a horizontal or vertical surface and still be adjusted to accommodate any fishing circumstance encountered. In addition, the fishing rod holder of the invention is of relatively simple construction; easy to use and economical to manufacture.

In general, the fishing rod holder of the invention comprises means for mounting said fishing rod holder on a substantially flat surface; an arm member one end of which is rotatably secured to said mounting means such that said arm member can be rotated through a circular plane substantially parallel to said flat surface; means to lock said arm member to said mounting means at any arcuate angle in its circular plane of rotation; a tubular fishing rod holder member, one end of which is capable of receiving and supporting the handle of a fishing rod and the other end of which is rotatably secured to the other end of said arm member such that said tubular member can be rotated through a circular plane substantially perpendicular to the circular plane of rotation of said arm member; and, means to lock said tubular member to said arm member at any arcuate angle in the plane of rotation of said tubular member.

BRIEF DESCRIPTION OF THE DRAWING

The fishing rod holder of the invention will be more readily understood from the ensuing description when considered together with the accompanying drawing wherein like reference numerals denote like parts and wherein.

DETAILED DESCRIPTION OF PREFERRED EMBODIMENTS

Figure 1:
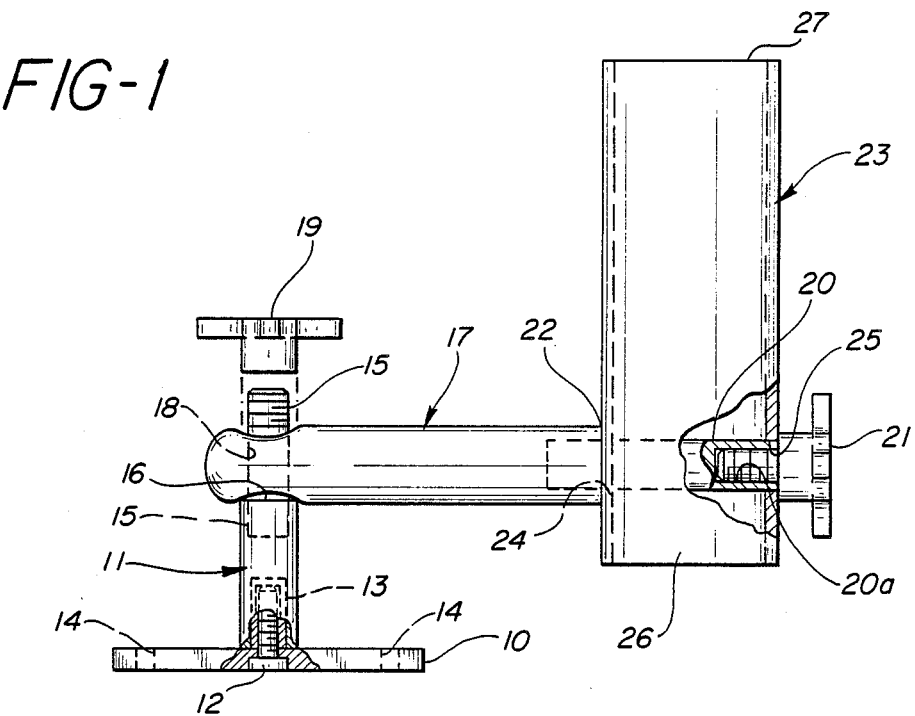
FIG. 1 is an elevation view of the fishing rod holder in the invention, part broken away, part exploded and part shown in phantom to reveal details thereof.

As shown in FIG. 1, the fishing rod holder of the invention is provided with a mounting base or mounting plate 10 having a mounting post 11 projecting from it, the longitudinal axis of the mounting post 11 being substantially perpendicular to the planar surface of the mounting plate. Mounting plate 10 and mounting post 11 can be manufactured to be a one piece, unitary element or, as shown in FIG. 1, can be separately manufactured and joined together by means of recessed bolt 12 threadably joining mounting plate 10 to mounting pin 11 through internal sleeve 13.

Mounting plate 10 can be secured to an appropriate flat surface of a boat such as a gunwale or bulkhead by inserting suitable fastening means such as bolts, self-tapping screws, etc (not shown) through apertures 14 to affix the mounting plate 10 to the desired surface. It should be recognized that when mounting plate 10 is secured to a substantially horizontal surface such as a gunwale, mounting post 11 will be positioned substantially vertically upward from that surface. On the other hand, when mounting plate 10 is secured to a substantially vertical surface such as a bulkhead, mounting post 11 will be positioned substantially horizontally outward from that surface.

The other end of mounting post 11 terminates in a threaded stud 15 which is set in from the perimeter of mounting post 11 to provide a peripheral shoulder 16.

A swivel arm 17 is rotatably mounted to mounting post 11 by means of through slot 18 formed adjacent on end of swivel arm 17 and sized to receive threaded stud 15 therethrough permitting swivel arm 17 to rest on the shoulder 16 of the mounting post 11. Swivel arm 17 can be secured to mounting post 11 by threading female knob 19 onto stud 15 until knob 19 frictionally engages and locks swivel arm 17 against shoulder 16 of mounting post 11.

Extending outwardly from the other end of swivel arm 17 is a swivel pin 20, whose end at 20a is internally threaded to receive male knob 21. Swivel pin 20 is set in from the perimeter of swivel arm 17 to form a swivel pin peripheral shoulder 22.

A tubular fishing rod holder 23 is rotatably mounted onto swivel pin 20 by inserting swivel pin 20 through opposed appertures 24, 25 formed in fishing rod holder 23 adjacent on end 26 thereof. The other end 27 of fishing rod holder 23 is open to receive the handle of a fishing rod (not shown) until the butt end of the handle rests upon swivel pin 20. Since the butt end of the handle of a fishing rod will engage and rest upon swivel pin 20, end 26 of fishing rod holder 23 can be left opened or can be closed by means of a suitable end piece (not shown). Fishing rod holder 23 can be secured to swivel pin 20 by threading male knob 21 into threads 20a until knob 21 frictionally engages and locks fishing rod holder 23 against shoulder 22 of swivel arm 17.

Figure 2:
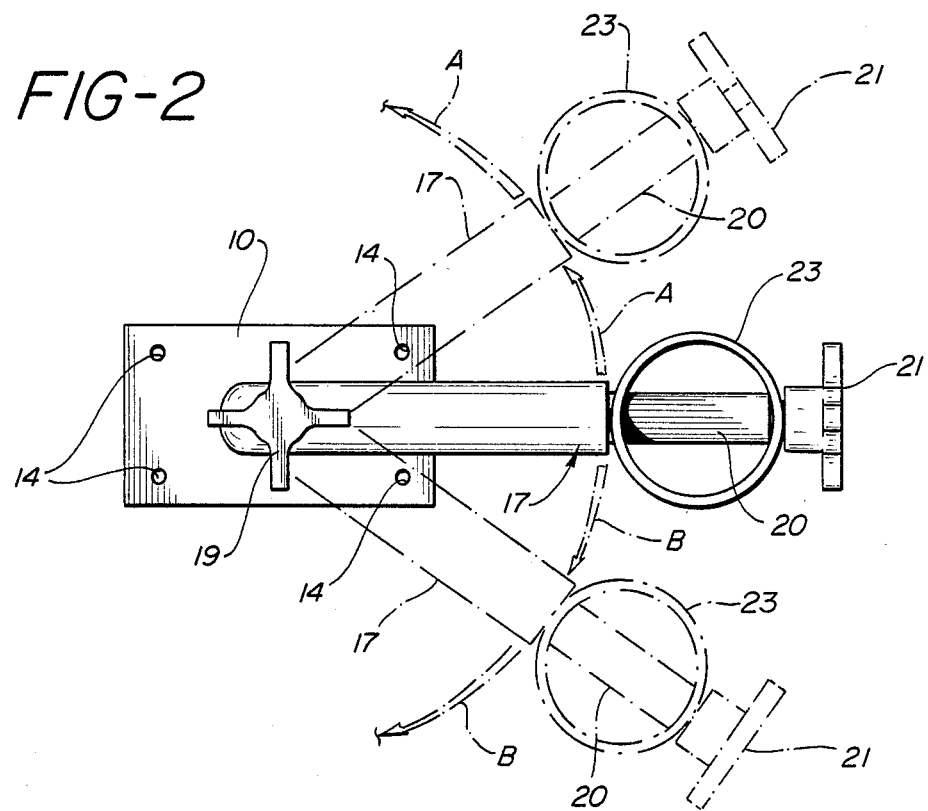
FIG. 2 is a top view of the fishing rod holder shown in FIG. 1 illustrating the rotatable feature of one member thereof.

As shown in FIG. 2, this assemblage enables swivel arm 17 to be rotated 360° in either direction as indicated by dashed arrowed lines A and B, through a circular plane that is substantially perpendicular to the longitudinal axis of mounting post 11 (or parallel to the flat surface to which mounting plate 10 is secured). Female knob 19 permits swivel arm 17 to be securely locked to mounting post 11 at any arcuate angle desired in the circular plane of rotation of swivel arm 17.

Figure 3:
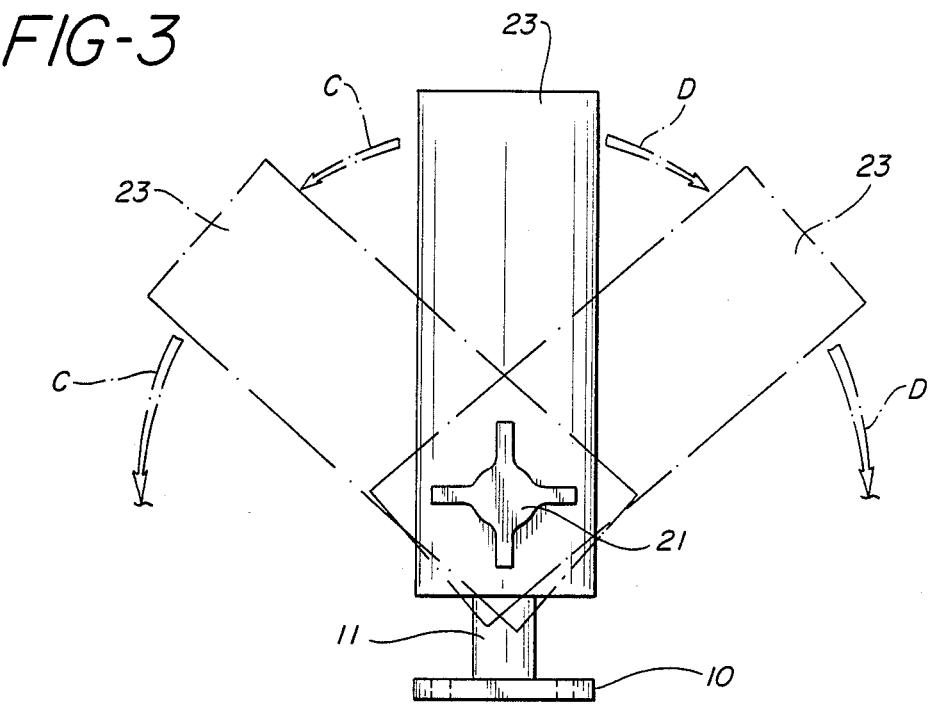
FIG. 3 is an end view of the fishing rod holder shown in FIG. 1 illustrating the rotatable feature of another member thereof.

Similarly, as shown in FIG. 3, this assemblage also enables fishing rod holder 23 to be rotated 360° in either direction as indicated by dashed arrowed lines C and D, through a circular plane that is substantially perpendicular to the circular plane of rotation of swivel 17. Male knob 21 permits fishing rod holder 23 to be securely locked to swivel arm 17 at any arcuate angle desired in the circular plane of rotation of finshing rod holder 23.

Since both swivel arm 17 and fishing rod holder 23 can each be rotated through 360°, an infinite number of relative positions can be provided between swivel arm 17 and fishing rod holder 23 to thereby accommodate any variety of fishing circumstances that one may encounter.

Figure 4:
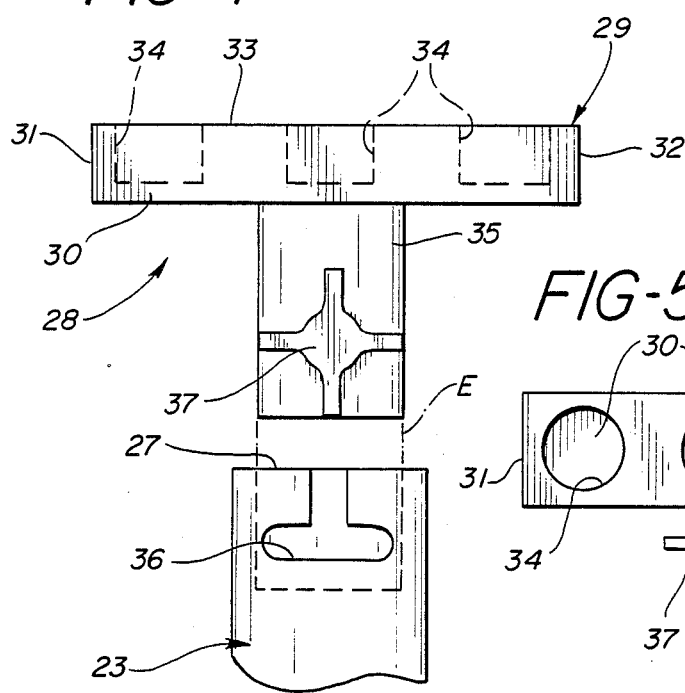
FIG. 4 is an elevation view of a beverage container accesory assemblage that can be used with the fishing rod holder of FIG. 1.
Figure 5:
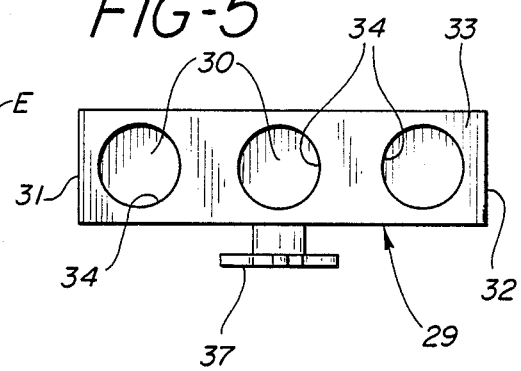
FIG. 5 is a top view of the assemblage shown in FIG. 4.

In a further embodiment of the invention shown in FIGS. 4 and 5, the fishing rod holder 23 can be adapted to receive and hold a removable beverage container generally identified by reference numeral 28. Beverage container 28 consists of a generally rectangular tray member 29 having a bottom 30, opposed ends 31, 32 and a top 33 in which a plurality of apertures 34 are provided and are of a size to receive beverage containers such as coffee cups, soda cups, and the like, so that the bottoms of the beverage containers rest on bottom 30 and are restrained within apertures 34. If desired, tray member 29 can also be provided with opposed sides (not shown). A steam member 35 can be secured to the underside of the bottom 30 and sized to slide into the open end 27 of fishing rod holder 23 as indicated by broken line E. In order to secure the beverage container 28 to fishing rod holder 23, an inverted T-slot 36 can be formed at the open end 27 of fishing rod holder 23 so that the upper end of T-slot 36 is co-terminus with open end 27. A male knob 37 can be threadably secured to stem 35 and its threaded bolt (not shown) can be guided through inverted T-slot 37 as stem 35 is slid into open end 27 of fishing rod holder 23. Male knob 37 can then be threaded further into stem 35 to frictionally engage and lock stem 35 against the inner wall of open end 27.

Figure 6:
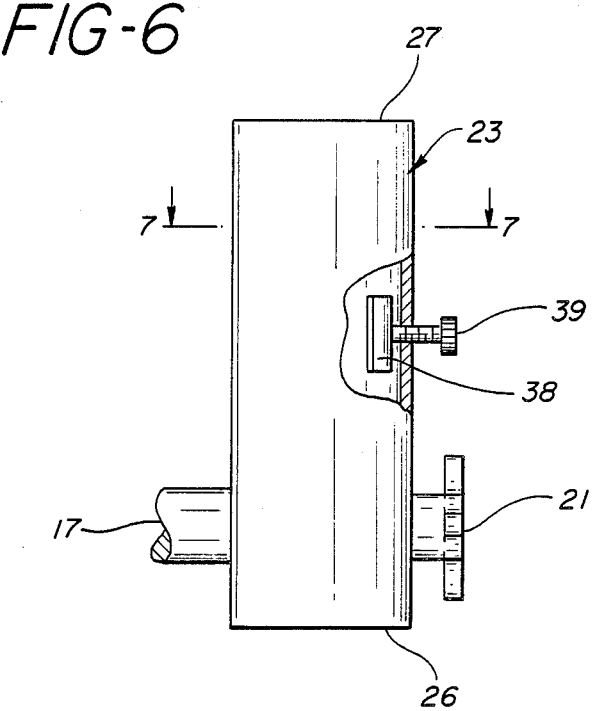
FIG. 6 is an elevation view, part broken away for clarity, illustrating an assemblage for securing the handle of a fishing rod within the fishing rod of FIG. 1; and, FIG. 7 is a view taken substantially on the line 7—7 of FIG. 6.
Figure 7:
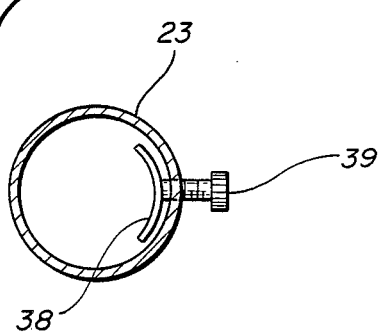

In another embodiment of the invention, means can be provided within and intermediate the ends of the fishing rod holder to firmly secure the handle of a fishing rod inserted into fishing rod holder. One such means is illustrated in FIGS. 6 and 7 and consists of an arcuate member 38 positioned within and intermediate the ends of fishing rod holder 23. Arcuate member 38 can be retained within fishing pole holder 23 by means of bolt 39 which threadably engages the wall of fishing pole holder 23. Arcuate member 38 is secured to an unthreaded end portion of bolt 39 (not shown) so that arcuate member 38 remains in a fixed position with respect to the inner wall of fishing rod holder 23 as bolt 39 is threaded and unthreaded. Thus, arcuate member 39 can be moved toward the longitudinal axis of fishing rod holder 23 by means of bolt 39 to frictionally secure the handle of a fishing pole between it and the opposite wall of fishing rod holder 23. When not in use or not desired to be used, arcuate member 38 can be retracted away from the longitudinal axis of fishing pole holder 23.

Although members of the fishing rod holder of the invention such as the mounting post, swivel arm and tubular fishing rod holder have been described and illustrated in the several Figs. of the drawing as having circular cross-sections, it should be understood and will be appreciated that such members can have any cross-sectional configuration desired such as square, rectangular, hexagonal, octagonal, and the like. Thus, although preferred embodiments of the fishing rod holder of the invention have been described in detail, it should be further understood that changes and modifications can be made therein without departing from the scope and spirit of the invention defined in the claims.

What is claimed is:

1. A fishing rod holder comprising:
   a. means for mounting said fishing rod holder on a substantially flat surface;
   b. an arm member, one end of which is rotatably secured to said mounting means such that said arm member can be rotated through a circular plane substantially parallel to said flat surface;
   c. means to lock said arm member to said mounting means at any arcuate angle in the circular plane of rotation of said arm member;
   d. a tubular fishing rod holder member, one end of which is capable of receiving the handle of a fishing rod and the other end of which is rotatably secured to the other end of said arm member such that said tubular member can be rotated through a circular plane substantially perpendicular to the circular plane of rotation of said arm member; and,
   e. means to lock said tubular member to said arm member at any arcuate angle in the circular plane of rotation of said tubular member.

2. The fishing rod holder of claim 1 wherein the circular planes of rotation of said arm member and said tubular member are through 360°.

3. The fishing rod holder of claim 1 wherein said mounting means comprises a mounting plate and a mounting post projecting therefrom such that the circular plane of rotation of said arm member is substantially perpendicular to said mounting post.

4. The fishing rod holder of claim 1 which includes a removable beverage container assemblage comprising:
   a. a tray member having means to receive and hold a plurality of beverage containers therein;
   b. a stem member extending from said tray member capable of being inserted into said one end of said tubular member; and,
   c. locking means associated with said stem member to secure said stem member to said tubular member.

5. The fishing rod holder of claim 1 which includes a fishing rod handle securing assemblage comprising:
   a. an arcuate member positioned within and intermediate the ends of said tubular member; and
   b. adjusting means engaging said arcuate member through the wall of said tubular member such that said arcuate member can be moved toward and away from the longitudinal axis of said tubular member to secure the handle of a fishing rod therebetween.

* * * * *